(12) United States Patent
Odaka

(10) Patent No.: US 7,150,850 B2
(45) Date of Patent: Dec. 19, 2006

(54) PROCESS FOR PRODUCING SILICON CARBIDE SINTER JIG

(75) Inventor: Fumio Odaka, Niiza (JP)

(73) Assignee: Bridgestone Corporation, Tokyo (JP)

( * ) Notice: Subject to any disclaimer, the term of this patent is extended or adjusted under 35 U.S.C. 154(b) by 88 days.

(21) Appl. No.: 10/494,258

(22) PCT Filed: Oct. 30, 2002

(86) PCT No.: PCT/JP02/11292

§ 371 (c)(1),
(2), (4) Date: May 4, 2004

(87) PCT Pub. No.: WO03/040059

PCT Pub. Date: May 15, 2003

(65) Prior Publication Data

US 2004/0259717 A1    Dec. 23, 2004

(30) Foreign Application Priority Data

Nov. 8, 2001    (JP)    ............................. 2001-343427

(51) Int. Cl.
*C01B 31/30* (2006.01)
*C04B 35/569* (2006.01)

(52) U.S. Cl. ...................... 264/682; 264/625; 264/657; 264/676

(58) Field of Classification Search ................ 264/332, 264/682, 109, 641, 674, 676, 122, 625, 647, 264/683

See application file for complete search history.

(56) References Cited

U.S. PATENT DOCUMENTS

| | | | | |
|---|---|---|---|---|
| 5,179,049 A | * | 1/1993 | Numata et al. ................ | 501/88 |
| 6,013,236 A | * | 1/2000 | Takahashi et al. .......... | 423/345 |
| 6,187,704 B1 | * | 2/2001 | Takahashi et al. ............ | 501/90 |
| 6,544,599 B1 | * | 4/2003 | Brown et al. ................ | 427/475 |
| 6,821,617 B1 | * | 11/2004 | Odaka et al. ................ | 428/332 |
| 2004/0262821 A1 | * | 12/2004 | Odaka ........................ | 264/682 |
| 2006/0000822 A1 | * | 1/2006 | Nakamura .................. | 219/409 |

FOREIGN PATENT DOCUMENTS

| | | |
|---|---|---|
| JP | 63-242968 A | 10/1988 |
| JP | 11-71181 A | 3/1999 |
| JP | 2000-154063 A | 6/2000 |

* cited by examiner

*Primary Examiner*—Steven P. Griffin
*Assistant Examiner*—Carlos Lopez
(74) *Attorney, Agent, or Firm*—Sughrue Mion, PLLC

(57) ABSTRACT

The present invention provides a sintered silicon carbide jig production method capable of simply increasing the purity of a sintered silicon carbide jig. A method of producing a sintered silicon carbide jig comprising a process in which a second sintered body is heated at a temperature rising rate of 3 to 5° C./min up to heating treatment temperature selected in the range of 2200 to 2300° C. under an argon atmosphere, kept at the same heating treatment temperature for 3 hours, and cooled at a temperature lowering rate of 2 to 3° C./min down to 1000° C.

5 Claims, No Drawings

PROCESS FOR PRODUCING SILICON CARBIDE SINTER JIG

RELATED APPLICATION

This application claims benefit of priority based on Japanese Patent Application filed previously by the applicant, namely, Japanese Patent Application No. 2001-343427 (filing date: Nov. 8, 2001), the contents of which are herein incorporated by reference.

BACKGROUND OF THE INVENTION

1. Field of the Invention

The present invention relates to a method of producing a sintered silicon carbide jig used for producing semiconductors, and a sintered silicon carbide jig obtained by this production method. More specifically, the present invention relates to a method of producing a sintered silicon carbide jig suitable for production of a dummy wafer, and a dummy wafer obtained by this production method.

2. Description of the Related Art

Conventionally, a sintered silicon carbide jig has been paid to attention as a material used in the high temperature range since it has excellent properties such as high temperature strength, heat resistance, friction resistance, chemical resistance and the like. Recently, a sintered silicon carbide jig is used as an alternative material to quartz as a production jig for semiconductors.

For use of the above-mentioned sintered silicon carbide as a semiconductor-related part, high purity is necessary. Since it is essential that further high purification is required in the further, development of a sintered silicon carbide jig of higher purity is required.

In technologies relating to conventional sintered silicon carbide jigs, however, close attention is necessary for improving the purity of a sintered silicon carbide jig and there remains room for improvement in complicated operation processes and the like.

SUMMARY OF THE INVENTION

The present invention relates to the following described matters.

<1> A method of producing a sintered silicon carbide jig used for producing semiconductors, comprising:

(a) sintering either a mixture of a silicon carbide powder and a nonmetal-based sintering aid or a molded body prepared from the above-mentioned powder mixture, by a hot press method to obtain a first sintered body, (b) subjecting the above-mentioned first sintered body to working-treatment to obtain a second sintered body, (c) subjecting the above-mentioned second sintered body to heat treatment under an argon atmosphere at 2000 to 2400° C., to outward-diffusing impurities in the above-mentioned second sintered body to remove the impurities to obtain a third sintered body, (d) subjecting the above-mentioned third sintered body to surface working treatment to obtain a sintered silicon carbide jig, and (e) washing the above-mentioned sintered silicon carbide jig.

<2> The method of producing a sintered silicon carbide jig according to <1>, wherein, in the above-mentioned process (c), the above-mentioned second sintered body is subjected to heat treatment under an argon atmosphere at 2200 to 2300° C.

<3> The method of producing a sintered silicon carbide jig according to <1> or <2>, wherein, in the above-mentioned process (c), the above-mentioned second sintered body is heated at a temperature rising rate of 5° C./min up to heat treatment temperature selected in the range from 2200 to 2300° C. at a pressure of 0.05 to 0.1 kg/cm$^2$ under an argon atmosphere, kept at the above-mentioned heat treatment temperature for 1 to 5 hours, and cooled at a temperature lowering rate of 3° C./min down to 1000° C.

<4> The method of producing a sintered silicon carbide jig according to any one of <1> to <3>, wherein the Fe concentration on the surface of the sintered silicon carbide jig after the above-mentioned process (e) is $0.5 \times 10^{10}$ atms/cm$^2$ or less.

<5> The method of producing a sintered silicon carbide jig according to any one of <1> to <4>, wherein the total impurity concentration on the surface of the sintered silicon carbide jig after the above-mentioned process (e) is $1.0 \times 10^{10}$ atms/cm$^2$ or less.

<6> A sintered silicon carbide jig produced by the production method according to any of <1> to <5>.

DESCRIPTION OF THE PREFERRED EMBODIMENTS

There has been required a method of producing a sintered silicon carbide jig capable of simply improving the purity of a sintered silicon carbide jig. Further, the embodiment of the present invention has been made to obtain a sintered silicon carbide jig of high purity.

First, raw materials used for production of a sintered silicon carbide jig of the present invention will be explained.

(Raw Materials)

— Silicon Carbide Powder —

The silicon carbide powder used as the raw material of a sintered silicon carbide jig of the embodiment of the present invention includes an α type powder, β type powder, amorphous powder and mixtures thereof and the like, and particularly, a β type silicon carbide powder is suitably used. The grade of this β type silicon carbide powder is not particularly restricted, and for example, generally marketed β type silicon carbide powders can be used. It is preferable that the particle size of this silicon carbide powder is smaller from the standpoint of increase in density, and it is preferably from about 0.01 to 10 μm, further preferably from about 0.05 to 1 μm. When the particle size is less than 0.01 μm, handling in treating processes such as measurement, mixing and the like is difficult, an when over 10 μm, its specific surface area becomes smaller, namely, contact area with adjacent powders becomes smaller, and increase in density is difficult, undesirably.

As a suitable embodiment of a silicon carbide powder, those having a particle size of 0.05 to 1 μm, a specific surface area of 5 m$^2$/g or more, a free carbon content of 1% or less and an oxygen content of 1% or less are suitably used. The particle size distribution of a silicon carbide powder used is not particularly restricted, and that having two or more maximum values can also be used, from the standpoints of increase in the filling density of a powder and the reactivity of a silicon carbide, in producing a sintered silicon carbide jig.

For obtaining a sintered silicon carbide jig of high density, it is advantageous to use a silicon carbide powder of high density, as a raw material silicon carbide powder.

A silicon carbide powder of high density can be obtained by a production method comprising a calcination process in which a silicon source containing at least one or more liquid silicon compounds, a carbon source containing at least one or more liquid organic compounds producing carbon by heating, and a polymerization or cross-linking catalyst are uniformly mixed to obtain solid which is then calcinated under a non-oxidation atmosphere. The silicon source containing liquid silicon compounds, for example, a liquid silicon compound can also be used together with a solid silicon compound.

As the silicon compound used for production of a silicon carbide powder of high purity (hereinafter, appropriately referred to as silicon source), those in liquid form and those in solid form can be used together, however, at least one of them should be selected from liquid compounds. As the liquid compound, polymers of alkoxysilanes (mono-, di-, tri-, tetra-) and tetraalkoxysilanes are used. Of alkoxysilanes, tetraalkoxysilanes are suitably used. Specifically, methoxysilane, ethoxysilane, propoxysilane, butoxysilane and the like are listed, and ethoxysilane is preferable from the standpoint of handling. As the polymer of tetraalkoxisilanes, there are mentioned lower molecular weight polymers (oligomers) having a degree of polymerization of about 2 to 15 and silicic acid polymers having higher polymerization degree in the form of liquid. Mentioned as the solid compound which can be used together with these compounds is silicon oxide. This silicon oxide includes, in the embodiment of the present invention, silica sol (colloidal super fine silica-containing liquid, containing an OH group or alkoxyl group inside), silicon dioxide (silica gel, fine silica, quartz powder) and the like, in addition to SiO.

Of these silicon sources, an oligomer of tetraethoxysilane and a mixture of an oligomer of tetraethoxysilane and fine powdery silica, and the like are suitable from the standpoints of excellent uniformity and excellent handling. As these silicon sources, substances of high purity are used, and those having an initial impurity content of 20 ppm or less are preferable and those having an initial impurity content of 5 ppm or less are further preferable.

As the organic compound producing carbon by heating used in producing a silicon carbide powder of high purity, those in liquid form can be used and additionally, those in liquid form can be used together with those in solid form, and preferable are organic compounds having high actual carbon ratio and being polymerized or cross-linked with a catalyst or by heating, specifically, monomers and prepolymers of resins such as a phenol resin, furan resin, polyimide, polyurethane, polyvinyl alcohol and the like, and in addition, liquid compounds such as cellulose, sucrose, pitch, tar and the like are used, particularly, resol type phenol resins are preferable. Though the purity thereof can be appropriately controlled and selected depending on its object, it is desirable to use an organic compound not containing each metal of 5 ppm or more particularly when a silicon carbide powder of high purity is necessary.

The ratio of carbon to silicon in the embodiment of the present invention (hereinafter, abbreviated as C/Si ratio) is defined by element analysis of a carbide intermediate obtained by carbonizing a mixture at 1000° C. Stoichiometrically, when the C/Si ratio is 3.0, the free carbon content in the produced silicon carbide should be 0%, however, actually, free carbon is generated at lower C/Si ratio, by evaporation of a SiO gas produced simultaneously. It is important to previously determine composition so that the free carbon content in this produced silicon carbide powder is not an amount unsuitable for production of a sintered body and the like. Usually, in calcination at a temperature of 1600° C. or more and a pressure around 1 atm, free carbon can be controlled when the C/Si ratio is regulated to 2.0 to 2.5, and this range can be suitable adopted. When the C/Si ratio is 2.5 or more, free carbon increases remarkably, however, this free carbon has an effect of suppressing grain growth, therefore, the ratio may also be appropriately selected depending on the object of particle formation. In calcination at a lower or higher atmosphere pressure, however, the C/Si ratio for obtaining a pure silicon carbide varies, therefore, in this case, its range is not necessarily restricted to the above-mentioned C/Si ratio.

An action in sintering free carbon is very weak as compared with that of carbon derived from nonmetal-based sintering aid coated on the surface of a silicon carbide powder used in the embodiment of the present invention, therefore, is can be ignored basically.

For obtaining solid prepared by uniformly mixing a silicon source and an organic compound producing carbon by heating in the embodiment of the present invention, it is also effected that a mixture of a silicon source and the organic compound is hardened to give solid, if necessary. As the hardening method, there are mentioned a method of cross-linking by heating, a method of hardening with a hardening catalyst, and a method using electro beam or radiation. The hardening catalyst can be appropriately selected depending on the silicon source, and in the case of a phenol resin and a furan resin, there are used acids such as toluenesulfonic acid, toluene carboxylic acid, acetic acid, oxalic acid, hydrochloric acid, sulfuric acid and the like, and amines such as hexamine and the like.

This raw material mixed solid is carbonized under heat if necessary. This is conducted by heating the solid in a non-oxidation atmosphere such as nitrogen or argon and the like at 800 to 1000° C. for 30 to 120 minutes.

Further, this carbide is heated in a non-oxidation atmosphere such as argon and the like at 1350° C. or more and 2000° C. or less, to produce a silicon carbide. The calcination temperature and time can be appropriately selected depending on properties such as desired particle size and the like, and for more efficient production, calcination at 1600 to 1900° C. is desirable.

When a powder of higher purity is necessary, impurities can be further removed by performing heating treatment at 2000 to 2100° C. for 5 to 20 minutes in the above-mentioned calcination.

As described above, as the method of obtaining a silicon carbide powder of particularly high purity, there can be used a method of producing a raw material powder described in a method of producing a single crystal filed previously as Japanese Patent Application No. H7-241856 by the present applicant, namely, a method of producing a silicon carbide powder of high purity, characterized in that the method comprises a silicon carbide production process of uniformly mixing one or more compounds selected from tetraalkoxysilanes of high purity and tetraalkoxysilane polymers as a silicon source and an organic compound of high purity producing carbon by heating as a carbon source, and calcinating by heating, under a non-oxidation atmosphere, the resulted mixture to obtain a silicon carbide powder, and a post treatment process in which the resulted silicon carbide powder is maintained at temperatures of 1700° C. or more and less than 2000° C., and heat treatment at temperatures of 2000 to 2100° C. for 5 to 20 minutes is conducted at least once during the above-mentioned temperature maintenance, wherein the above-mentioned two processes are conducted to obtain a silicon carbide powder having a content of each impurity element of 0.5 ppm or less.

— Nonmetal-Based Sintering Aid —

As the nonmetal-based sintering aid used in admixture with the above-mentioned silicon carbide powder in producing a sintered silicon carbide of the embodiment of the present invention, a substance referred to as so-called carbon source producing carbon by heating is used, and listed are organic compounds producing carbon by heating or silicon carbide powders (particle size: about 0.01 to 1 μm) having surface coated with these organic compounds, and the former is preferable from the standpoint of its effect.

As the organic compound producing carbon by heating, there are specifically listed coal tar pitch, pitch tar, phenol resins, furan resins, epoxy resins and phenoxy resins, and various saccharides such as monosaccharides such as glucose and the like, oligosaccharides such as sucrose and the like, polysaccharides such as cellulose, starch and the like, having high actual carbon ratio. As these compounds, there are suitably used those in the form of liquid at normal temperature, those dissolved in a solvent, and those having a property of softening or becoming liquid by heating such as thermoplasticity or heat fusion property, for the purpose of uniform mixing with a silicon carbide powder, and of them, suitable are phenol resins giving a molded body of high strength, particularly, resol type phenol resins.

It is believed that this organic compound produces, when heated, an inorganic carbon-based compound such as carbon black and graphite in the system, and this compound acts effectively as a sintering aid. The effect of the embodiment of the present invention cannot be obtained even if carbon black or graphite powder is added as a sintering aid.

(Method of Producing Sintered Silicon Carbide Jig)

Next, one embodiment will be mentioned to explain a method of producing a sintered silicon carbide jig used for producing semiconductors. The above-mentioned method of producing a sintered silicon carbide jig of the embodiment of the present invention comprises the following process (a) to (e) of:

(a) sintering either a mixture of a silicon carbide powder and a nonmetal-based sintering aid or a molded body prepared from the above-mentioned powder mixture, by a hot press method to obtain a first sintered body, (b) subjecting the above-mentioned first sintered body to discharge working or mechanical working treatment to obtain a second sintered body, (c) subjecting the above-mentioned second sintered body to heat treatment under an argon atmosphere at 2000 to 2400° C., to obtain a third sintered body, (d) subjecting the above-mentioned third sintered body to surface working treatment to obtain a sintered silicon carbide jig, and (e) washing the above-mentioned sintered silicon carbide jig.

By providing the process (c), impurities in the second sintered body are outward-diffused, therefore, the purity in the finally obtained sintered silicon carbide jig will increase.

This effect is really surprising since it has been conventionally believed that when heat treatment is conducted before surface working, impurities are outward-diffused and the purity of the finally resulting sintered silicon carbide jig lowers.

In the embodiment of the present invention, "outward-diffusion" means that impurities in the second sintered body are diffused onto the surface of the second sintered body and the impurities are diffused (released) into a gas phase, to decrease the impurity concentration in the second sintered body. "Diffusion" has a wider meaning including also an idea of the above-mentioned outward-diffusion.

Subsequently, individual processes in the method of producing a sintered silicon carbide jig of the embodiment of the present invention will be illustrated further in detail.

<Process (a)>

(a-1):

In producing a sintered silicon carbide jig of the embodiment of the present invention, first, a silicon carbide powder and a nonmetal-based sintering aid described in the former stage of this specification are uniformly mixed, to obtain a mixture of the silicon carbide powder and the nonmetal-based sintering aid. In this procedure, it is preferable that a nonmetal-based sintering aid is dissolved or dispersed in a solvent before mixing with a silicon carbide powder. As the solvent, those suitable for a compound used as a nonmetal-based sintering aid can be selected, and specifically, for a phenol resin which is a suitable organic compound producing carbon by heating, it is possible to select lower alcohol such as ethyl alcohol and the like, and ethyl ether, acetone and the like. Also regarding this nonmetal-based sintering aid and solvent, it is preferable to use those having a low impurity content.

When the addition amount of a nonmetal-based sintering aid mixed with a silicon carbide powder is too small, the density of a sintered body does not increase, and when the addition amount thereof is too large, the amount of free carbon contained in a sintered body increases, causing a possibility of disturbance of increase in density, therefore, it is generally preferable to control the addition amount to 10 wt % or less, preferably 2 to 5 wt %, depending on the kind of a nonmetal-based sintering aid used. This amount can be determined by previously quantifying the amount of silica (silicon oxide) on the surface of a silicon carbide powder using fluorine, and calculating an amount stoichiometrically sufficient for its reduction.

The addition amount in terms of carbon amount is a value obtained by hypothesizing that silica quantified by the above-mentioned method is reduced by carbon derived from a nonmetal-based sintering aid according to the following chemical reaction formula and taking into consideration the actual carbon ratio after thermal decomposition of a nonmetal-based sintering aid (proportion of carbon production in a nonmetal-based sintering aid).

$$SiO_2 + 3C \rightarrow SiC + 2CO$$

In the sintered silicon carbide jig of the embodiment of the present invention, it is preferable that the total amount of carbon atoms derived from a silicon carbide and carbon atoms derived from a nonmetal-based sintering aid, contained in a sintered silicon carbide jig, is over 30 wt % and 40 wt % or less. When a sintered silicon carbide jig contains utterly no impurity, the content of carbon atoms in the above-mentioned sintered body jig is theoretically 30 wt %. Namely, when the proportion of impurities contained in the above-mentioned sintered body jig increases, the content of carbon atoms in the sintered body jig is 30 wt % or less, undesirably. When the content is over 40 wt %, the carbon content increases and the density of the resulting sintered silicon carbide jig decreases, and various properties of the sintered silicon carbide jig such as strength, oxidation resistance and the like deteriorate, undesirably.

In uniformly mixing a silicon carbide powder and a nonmetal-based sintering aid, it is preferable, as described above, that a phenol resin which is a nonmetal-based sintering aid is dissolved in a solvent such as ethyl alcohol and the like and sufficiently mixed with a silicon carbide powder. Mixing can be conducted by a known mixing means, for example, a mixer, planet ball mill and the like. It is preferable that mixing is conducted for 10 to 30 hours, particularly, for 16 to 24 hours. After sufficient mixing, a solvent is removed at temperatures suitable for the physical properties of the solvent, for example, at temperature from 50 to 60° C. in the case of ethyl alcohol listed previously, and a mixture is evaporated to dryness, then, sieved to obtain a raw material powder of the mixture. From the standpoint of increase in purity, it is necessary that materials of a ball mill vessel and a ball are made of synthetic resins having as low metal content as possible. In drying, a granulation apparatus such as a spray drier and the like may be used.

(a-2):

A molded body of a mixture of the above-mentioned powder or a mixture of a powder obtained by the molding process (a-1-2) described later is placed in a molding metal mold under a non-oxidation atmosphere at a temperature of 2000 to 2400° C. and a pressure of 300 to 700 kgf/cm$^2$, and hot-pressed to produce a first sintered body. Regarding the molding metal mold herein used, it is preferable that a part or all of the mold is made of a graphite material or a Teflon sheet or the like is allowed to intervene in the mold so that the molded body and a metal portion of the mold do not directly contact, from the standpoint of the purity of the resulting sintered body.

The pressurization condition of the above-mentioned hot press is preferably 300 to 700 kgf/cm$^2$. When the pressurization condition is less than 300 kgf/cm$^2$, increase in density is insufficient, and when over 700 kgf/cm$^2$, breakage of a molding mold such as a graphite mold or the like is caused, leading to undesirable production efficiency. The pressure in pressurization can be selected depending on the particle size of a raw material powder, and a raw material powder having smaller particle size can provide a suitable sintered body even if pressure in pressurization is relatively smaller. In the case of pressurization at 400 kgf/cm$^2$ or more, it is necessary to select hot press parts herein used, for example, a dice, punch and the like, having excellent pressure resistance.

Temperature is raised from 1500° C. up to a maximum temperature of 2000 to 2400° C. over a period of 2 to 4 hours. In this case, sintering progresses quickly at 1850 to 1900° C. Further, this maximum temperature is maintained for 1 to 3 hours to complete sintering. When the maximum temperature is less than 2000° C., increase in density is insufficient, and when over 2400° C., there is undesirably a possibility of sublimation (decomposition) of a powder or molded body raw material.

Also in this sintering process, a graphite mold, a heat insulation material of a heating furnace, and the like are preferably made of a graphite raw material of high purity from the standpoint of maintenance of the purity of the resulting first sintered body, and a graphite raw material subjected to purity increasing treatment is used, and specifically, materials which can be sufficiently baked previously at temperatures of 2500° C. or more and generating no impurity at the sintering temperature are desirable. Further, also regarding an inert gas used, those of high purity containing little impurities are preferably used.

(a-1-2):

In the embodiment of the present invention, a sintered silicon carbide having excellent properties is obtained by effecting the above-mentioned sintering, and from the standpoint of increase in volume, a molding process described later may be performed prior to this sintering.

The molding process is a process in which a silicon carbide powder and a nonmetal-based sintering aid are uniformly mixed to obtain a raw material powder which is placed in a molding metal mold, and heated and pressed at temperatures in the range of 80 to 300° C. over 5 to 60 minutes, to prepare a molded body previously. Here, it is preferable that filling of a raw material powder into a metal mold is conducted under as close condition as possible, from the standpoint of increase in density of the finally obtained sintered silicon carbide jig. When this molding process is conducted, a bulky powder can be made compact previously in filling a sample for hot press, therefore, by repeating this molding process, a molded body having larger thickness can be produced easily.

Pressing is conducted at a heating temperature in the range of 80 to 300° C., preferably of 120 to 140° C. and a pressure in the rage of 60 to 100 kgf/cm$^2$ so as to give a density of a raw material powder filled of 1.5 g/cm$^3$ or more, preferably 1.9 g/cm$^3$ or more and the pressed condition is kept for 5 to 60 minutes, preferably 20 to 40 minutes, to obtain a molded body composed of a raw material powder. Here, it becomes more difficult to increase the density of a molded body when the average particle size of a powder is smaller, and for increasing density, it is preferable to adopt a method of vibration filling and the like in placing into a molding metal mold. Specifically, it is more preferable that the density is 1.8 g/cm$^3$ or more in the case of a powder having an average particle size of about 1 μm and the density is 1.5 g/cm$^3$ or more in the case of a powder having an average particle size of about 0.5 μm. When the density is less than 1.5 g/cm$^3$ or 1.8 g/cm$^3$ at respective particle sizes, it is difficult to increase the density of the finally obtained sintered silicon carbide jig.

This molded body can be subjected to cut working so as to be suitable for a hot press mold previously used before subjecting to the sintering process. This molded body is placed in a molding metal mold under anon-oxidation atmosphere at a temperature of 2000 to 2400° C. and a pressure of 300 to 700 kgf/cm$^2$, and subjected to a process of hot press, namely, to the sintering process, to obtain a first sintered body having high density and high purity.

<Process (b)>

Given working treatment is effected on a first sintered body produced by the above-mentioned process (a), to produce a second sintered body. For example, when a first sintered body is formed into cylindrical form in conducting the hot press treatment in the above-mentioned process (a), slice working is performed along the radial direction of this first sintered body to produce a second sintered body approximately in the form of disc. As the working method, there are mentioned discharge working and mechanical working, and from the standpoints of effective utilization of a sintered body and short working time, discharge working is suitably used. The above-mentioned discharge working is not particularly restricted, and can be conducted under appropriately selected conditions using a know method and a commercially available discharge working apparatus. In the case of discharge working, a discharge wire is used, and as the discharge wire, commercially available products can be suitably used, and any of a brass wire, coated wire and the like may be permissible. Usually, the discharge wire is always kept under no-loose condition between a delivery part delivering the discharge wire and a winding part winding the discharge wire delivered from the delivery part by a wire automatic feeding apparatus. The above-mentioned wire automatic feeding apparatus is so designed that the above-mentioned delivery part and the above-mentioned winding part can move simultaneously along a direction vertically crossing the delivery direction of the above-mentioned discharge wire.

Regarding the above-mentioned discharge working conditions, it is general that voltage between electrodes not loaded on a discharge wire is about 60 to 150 V, the cutting amount is about 30 to 50 mm$^2$/minute, the injection pressure of insulating liquid injected from the upper dice and the lower dice is about 10 to 20 kg/cm$^2$, and temperature is about 20 to 30° C.

The above-mentioned mechanical working treatment is not particularly restricted and can be conducted under appropriately selected conditions using a known method and a commercially available mechanical working apparatus.

<Process (c)>

The second sintered body produced as described above is subjected to heating and pressurizing treatment under an argon atmosphere at a temperature of 2200 to 2300° C. and a pressure of 0.05 to 0.1 kgf/cm$^2$. When the above-mentioned heating treatment temperature is less than 2200° C., impurities in the second sintered body are not sufficiently removed, and when over 2300° C., there is a possibility of sublimation of a powder or molding material, undesirably. When pressure is less than 0.05 kgf/cm$^2$, air invades a furnace, and when over 0.1 kgf/cm$^2$, a pressurization vessel (furnace vessel) is obstructed, undesirably.

Preferably, the above-mentioned second sintered body is heated at a temperature rising rate of 5° C./min or less up to heat treatment temperature selected in the range of 2200 to 2300° C. under an argon atmosphere at a pressure of 0.08 kgf/cm$^2$, kept at this temperature for 3 hours, and cooled at a temperature lowering rate of 3° C./min or less down to 1000° C. When the temperature rising rate is over 5° C./min, there is a possibility of generation of strain on the sintered body, and when the temperature lowering rate is over 3° C./min, there is a possibility of generation of strain on the sintered body or cracking of the sintered body.

After the temperature in the furnace lowers to room temperature, the sintered body is immediately removed, and around a temperature of about 25° C., the above-mentioned third sintered body is removed and subjected to the subsequent process.

<Processes (d), (e)>

The third sintered body obtained by the above-mentioned process is subjected to surface working, washing and the like depending on use object, to obtain a sintered silicon carbide jig.

In this case, surface working, washing and the like are not particularly restricted, and can be conducted using a known apparatus and method. For example, surface working is conducted by polishing the surface of the third sintered body using an apparatus such as a rotary grinder and the like or controlling the roughness of the surface of the sintered body. The above-mentioned washing is conducted, for example, by immersing the third sintered body to be washed in washing liquid or by performing flashing, ultrasonic treatment and the like on the third sintered body.

Thus, a sintered silicon carbide jig is produced by the above-mentioned production method. A sintered silicon carbide jig produced by the above-mentioned production method has extremely low impurity concentration. Namely, the Fe concentration on the surface of a sintered silicon carbide jig obtained by the embodiment of the present invention is $0.5 \times 10^{10}$ atms/cm$^2$ or less, preferably $0.2 \times 10^{10}$ atms/cm$^2$ or less. The total content of impurities in a sintered silicon carbide jig obtained by the embodiment of the present invention is 5 ppm or less, preferably 3 ppm or less, more preferably 1 ppm or less, further more preferably 0.5 ppm or less. From the standpoint of application to the semiconductor industry field, the impurity content measured by chemical analyses has only a meaning of reference. Practically, evaluation differs depending on whether impurities are uniformly distributed, or localized. Therefore, in general, those skilled in the art evaluate to what extent a wafer is polluted by impurities under given heating conditions using a practically apparatus, by various means. According to a production method comprising a calcination process in which a liquid silicon compound, a nonmetal-based sintering aid and a polymerization or cross-linking catalyst are uniformly mixed to obtain solid which is carbonated by heating under a non-oxidation atmosphere before further calcination under a non-oxidation atmosphere, the total content of impurities other than silicon, carbon and oxygen contained in the sintered silicon carbide can be lower to 1 ppm or less.

Further, a sintered silicon carbide jig obtained by the embodiment of the present invention has been treated sufficiently to get high density and has a density of 2.9 g/cm$^3$ or more. When the density of the resulted sintered body jig is less than 2.9 g/cm$^3$, dynamic properties such as bending strength, fracture strength and the like and electrical properties decrease, further, particle increases and a pollution property deteriorates, undesirably. The density of the sintered silicon carbide jig is more preferably 2.9 g/cm$^3$ or more.

In general, when the sintered body jig is a porous body, problems such as limited use and the like occur from the following ground. The ground includes as poor heat resistance, oxidation resistance, chemical resistance and mechanical strength, poor washing property, and poor material properties such as occurrence of small cracking to produce small pieces as a pollution substance, generation of gas permeability, and the like. However, such problems are extremely hard to occur when a sintered silicon carbide jig of the embodiment of the present invention is used.

In addition, a sintered silicon carbide jig sintered under an argon atmosphere obtained in the embodiment of the present invention has physical properties as described below in preferable embodiments. For example, the bending strength at room temperature is 500 to 650 kgf/mm$^2$, the bending strength at 1500° C. is 550 to 800 kgf/mm$^2$, the Young's modulus is $3.5 \times 10^4$ to $4.5 \times 10^4$, the Vickers hardness is 2000 kgf/mm$^2$ or more, the Poisson's ratio is 0.14 to 0.21, the thermal expansion coefficient is $3.8 \times 10^{-6}$ to $4.2 \times 10^6$ (° C.$^{-1}$), the thermal conductivity is 150 W/m·k or more, the specific heat is 0.15 to 0.18 cal/g·° C., the thermal shock resistance is 500 to 700ΔT° C., the specific resistance is 0.01Ω·cm or more.

A sintered silicon carbide jig obtained by the embodiment of the present invention has the physical properties as described above, therefore, is used for semiconductor production parts, electron information equipment parts and the like. As the main semiconductor production apparatus in which parts made of a sintered body of the embodiment of the present invention are used, there are listed, for example, an exposure apparatus, resist treatment apparatus, dry etching apparatus, washing apparatus, heat treatment apparatus, ion injection apparatus, CVD apparatus, PVD apparatus, dicing apparatus and the like, and examples of the parts include a plasma electrode for a dry etching apparatus, a protective ring (focus ring), a slit part (aperture) for an ion injection apparatus, a protective plate for an ion generation portion or mass spectrometry portion, a dummy wafer used in wafer treatment in a heat treatment apparatus or a CVD apparatus, a heat generation heater in a heat treatment apparatus, CVD apparatus or PVD apparatus, particularly, a heater having a lower portion directly heating a wafer, and the like.

As the electron information equipment part, listed are a disc foundation bed for a hard disk apparatus, a membrane magnetic head foundation bed and the like, and a sputtering target for formation of a membrane on the surface of a photomagnetic disc or on various sliding surfaces is also involved in this part.

As the optical part used, reflection mirrors for synchrotron radiation (SR), laser beam, and the like are also involved.

The production method of the embodiment of the present invention has been explained using the listed embodiments, however, the embodiment of the present invention is not construed to be limited to these embodiments. Therefore, in the production method of the embodiment of the present invention, known heating furnaces and reaction apparatuses can be used considering the pressure resistance of a sintering mold without particularly being limited to production apparatuses and the like provided that the above-mentioned heating conditions can be satisfied.

Regarding the purity of a silicon carbide powder which is a raw material powder of the embodiment of the present invention, a silicon source and a nonmetal-based sintering aid for producing a raw material powder, further, and further, an inert gas used for making a non-oxidation atmosphere, it is preferable that the content of each impurity element is 1 ppm or less, however, the content is not necessarily limited to this providing it is in the range in which purification in heating and calcination processes is permissible. The impurity elements here include elements belonging to group I to group XVI in the periodic table according to 1989 IUPAC inorganic chemistry nomenclature revised edition, having an atomic number of 3 or more, and excluding elements having an atomic number of 6 to 8 and 14 to 16.

EXAMPLES

The following examples and comparative examples will describe the present invention specifically, but it is needless to say that the scope of the present invention is not limited to the following examples.

Example 1

<Production of Molded Body>

90 g of a silicon carbide powder of high purity (average particle size 1.1 μm: silicon carbide powder having an impurity content of 5 ppm or less produced according to the above-mentioned production method filed as Japanese patent Application No. 7-241856: containing 1.5 wt % silica) and 10 g of a high purity liquid resol type phenol resin having a water content of 20% (actual carbon ratio after thermal decomposition: 50%) dissolved in 150 g of ethanol were stirred for 18 hours for sufficient mixing in a planet ball mill. Then, the mixture was heated at 50 to 60° C. to evaporate ethanol to dryness, and applied on a sieve of 500 μm to obtain a uniform silicon carbide raw material powder.

<Production of Sintered Body>

3 kg of this raw material powder was placed in a graphite mold having a diameter of 160 mm, and subjected to hot press under the following conditions using a resistance heating mode hot press as a hot press apparatus.

The powder was heated from room temperature to 700° C. over 6 hours under a vacuum condition of $10^{-5}$ to $10^{-4}$ torr, and kept at the same temperature for 5 hours (first temperature rising process). Next, the powder was heated from 700° C. to 1200° C. over 3 hours under a vacuum condition, further heated from 1200° C. to 1500° C. over 3 hours, and kept at the same temperature for 1 hour (second temperature rising process). Further, the powder was pressed at a pressure of 500 kgf/cm$^2$, heated from 1500° C. to 2200° C. over 3 hours under an argon atmosphere, and kept at the same temperature for 1 hour to obtain a first sintered body (hot press process).

<Working Treatment>

Slice working was conducted along the radius direction of the resulted first sintered body using a wire apparatus manufactured by Mitsubishi Electric Corp., to produce a second sintered body approximately in the form of disc having a diameter of 150 mm and a thickness of 2 mm.

<Heating Treatment>

The resulted second sintered body was placed in a heating furnace. The second sintered body was heated at a temperature rising rate of 4° C./min up to a maximum heating treatment temperature of 300° C., and kept at the same temperature for 3 hours. Then, the sintered body was cooled at a temperature lowering rate of 3° C./min down to 1000° C., then, forcibly cooled to obtain a third sintered body. The third sintered body was removed from the heating furnace at a removal temperature of 40° C., and subjected to the following process.

<Surface Working, Washing>

The resulted third sintered body was subjected to surface working using a rotary grinder, and the third sintered body after surface working was immersed into a treatment liquid bath containing pure water and an acid for 30 minutes for washing thereof. In this procedure, washing was conducted while irradiating the above-mentioned treatment liquid bath with an ultrasonic wave.

Thereafter, the impurity concentration of the dried sintered silicon carbide jig was measured.

The physical properties of the sintered silicon carbide jig obtained in Example 1 were measured in detail to find that the bending strength at room temperature was 570 kgf/mm$^2$, the bending strength at 1500° C. was 600 kgf/mm$^2$, the Young's modulus was $4.1 \times 10^4$, the Poisson's ratio was 0.15, the thermal expansion coefficient was $3.9 \times 10^{-6}$ (° C.$^{-1}$), the thermal conductivity was 200 W/m·k or more, the specific heat was 0.16 cal/g·° C. and the thermal shock resistance was 530ΔT° C., as other physical properties than those described above, confirming that all of the physical properties required for a sintered silicon carbide jig were satisfied.

Example 2

A sintered silicon carbide jig was produced in the same manner as in Example 1 except that the heating treatment temperature was set at 2250° C., and its impurity concentration was measured.

Example 3

A sintered silicon carbide jig was produced in the same manner as in Example 1 except that the maximum temperature keeping time was changed to 2 hours and its impurity concentration was measured.

Comparative Example 1

A sintered silicon carbide jig was produced in the same manner as in Example 1 except that the heating treatment at 2200 to 2300° C. was not conducted, and its impurity concentration was measured.

The results in Example 1 to 3 and Comparative Example 1 are summarized in Table 1.

TABLE 1

| Impurity | Example 1 | Example 2 | Example 3 | Comparative Example 1 |
|---|---|---|---|---|
| Fe | 0.14 | 0.19 | 0.16 | 0.66 |
| Ni | 0.00 | 0.01 | 0.00 | 0.00 |
| Remark | Unit of impurity concentration in table is $\times 10^{10}$ atm/cm$^2$ | | | |

From the above-mentioned results, it was confirmed that impurity concentration can be simply reduced according to the examples.

Though only the results of measurement of the concentrations of Fe and Ni which are main impurities in producing semiconductor parts and the like are described, it was confirmed that other impurities can be suitably removed like Fe and Ni according to the examples.

INDUSTRIAL APPLICABILITY

The present invention can simply increase the purity of a sintered silicon carbide jig used for production of semiconductors, by having the constitution as described above.

Further, a sintered silicon carbide jig of high purity used for producing semiconductors is provided.

What is claimed is:

1. A method of producing a sintered silicon carbide jig used for producing semiconductors, comprising:
    (a) sintering either a mixture of a silicon carbide powder and a nonmetal-based sintering aid or a molded body prepared from a mixture of a silicon carbide powder and a nonmetal-based sintering aid, by a hot press method to obtain a first sintered body,
    (b) subjecting the first sintered body to working-treatment to obtain a second sintered body,
    (c) subjecting the second sintered body to heat treatment under an argon atmosphere at 2000 to 2400° C., to outward-diffusing impurities in the second sintered body to remove the impurities to obtain a third sintered body,
    (d) subjecting the third sintered body to surface working treatment to obtain a sintered silicon carbide jig, and
    (e) washing the sintered silicon carbide jig.

2. The method of producing a sintered silicon carbide jig according to claim 1, wherein, in the process (c), the second sintered body is subjected to heat treatment under an argon atmosphere at 2200 to 2300° C.

3. The method of producing a sintered silicon carbide jig according to claim 1, wherein, in the process (c), the second sintered body is heated at a temperature rising rate of 50° C./min up to heat treatment temperature selected in the range from 2200 to 2300° C. at a pressure of 0.05 to 0.1 kg/cm$^2$ under an argon atmosphere, kept at the heat treatment temperature for 1 to 5 hours, and cooled at a temperature lowering rate of 3° C./min down to 1000° C.

4. The method of producing a sintered silicon carbide jig according to claim 1, wherein the Fe concentration on the surface of the sintered silicon carbide jig after the process (e) is $0.5 \times 10^{10}$ atms/cm$^2$ or less.

5. The method of producing a sintered silicon carbide jig according to claim 1, wherein the total impurity concentration on the surface of the sintered silicon carbide jig after the process (e) is $1.0 \times 10^{10}$ atms/cm$^2$ or less.

* * * * *